United States Patent
Benjamin et al.

(10) Patent No.: US 10,131,438 B2
(45) Date of Patent: Nov. 20, 2018

(54) EJECTOR SEAT WITH EJECTION RETRACTING BACKREST

(71) Applicant: AMI Industries, Inc., Colorado Springs, CO (US)

(72) Inventors: Jeff Benjamin, Colorado Springs, CO (US); James Tulloch, Colorado Springs, CO (US); Jeremy Ochs, Colorado Springs, CO (US); John Hampton, Colorado Springs, CO (US); Bradley Mastrolia, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 416 days.

(21) Appl. No.: 14/802,096

(22) Filed: Jul. 17, 2015

(65) Prior Publication Data
US 2017/0015428 A1 Jan. 19, 2017

(51) Int. Cl.
*B64D 25/10* (2006.01)
(52) U.S. Cl.
CPC .................... *B64D 25/10* (2013.01)
(58) Field of Classification Search
CPC .................................................... B64D 25/10
See application file for complete search history.

(56) References Cited

U.S. PATENT DOCUMENTS

| | | | | |
|---|---|---|---|---|
| 2,702,677 A | * | 2/1955 | Replogle | B64D 25/10 244/122 A |
| 2,726,831 A | * | 12/1955 | Replogle | B64D 25/10 244/122 A |
| 2,920,847 A | * | 1/1960 | Bohlin | B64D 25/10 244/122 AE |
| 2,971,729 A | * | 2/1961 | Martin | B64D 25/10 244/121 |
| 3,556,442 A | * | 1/1971 | Arnekull | B64D 25/10 244/122 R |
| 3,647,168 A | | 3/1972 | Eggert, Jr. et al. | |
| 3,648,954 A | | 3/1972 | Gaylord et al. | |
| 4,613,101 A | * | 9/1986 | Herndon | B64D 25/10 244/122 A |
| 4,784,352 A | | 11/1988 | Smith et al. | |
| 4,923,147 A | * | 5/1990 | Adams | A42B 3/0473 244/122 AG |
| 5,046,687 A | | 9/1991 | Herndon | |
| 6,292,945 B1 | | 9/2001 | Lewis et al. | |

(Continued)

*Primary Examiner* — Brian M O'Hara
*Assistant Examiner* — Keith L Dixon
(74) *Attorney, Agent, or Firm* — Kinney & Lange, P. A.

(57) ABSTRACT

An aircrew member must be properly positioned during flight to have a view inside and outside of the cockpit and to reach all aircraft controls. However, if an ejection event occurs, the aircrew member should be properly aligned with a thrust direction of the ejection seat to prevent injury. A retracting backrest for an ejection seat is deployed pre-flight to a desired flight position. A release mechanism engages a positioning member to secure the retracting backrest in the flight position. In response to an eject signal, the release mechanism disengages from the positioning member, and both the aircrew member and the retracting backrest are hauled back to properly align the aircrew member for ejection.

20 Claims, 8 Drawing Sheets

(56) References Cited

U.S. PATENT DOCUMENTS

| | | | |
|---|---|---|---|
| 6,299,103 B1 * | 10/2001 | Shope | B64D 11/0689 |
| | | | 244/122 A |
| 7,699,265 B2 | 4/2010 | Mastrolia | |
| 2007/0278347 A1 * | 12/2007 | Mastrolia | B60N 2/0232 |
| | | | 244/122 R |

* cited by examiner

EJECTOR SEAT WITH EJECTION RETRACTING BACKREST

BACKGROUND

The present invention relates to aircraft ejection seats. More particularly, the present invention relates to a backrest for an ejection seat.

During flight a pilot or other aircrew member may need to be accommodated to allow the aircrew member to have proper vision and reach within the cockpit. Aircrew accommodation includes properly positioning the aircrew member both during flight and in the event of an ejection. In flight accommodation includes comfort, proper positioning of the aircrew at the design eye for vision inside and outside of the cockpit, as well as positioning the aircrew member to reach and use all of the controls. A single ejection seat must be able to accommodate a wide range of aircrew sizes. The seatback of an ejection seat can be tilted forward to force the shoulders of the aircrew member forward, thereby increasing the reach of the aircrew member. Unlike during flight, where the aircrew member can be leaned forward to accommodate the reach and vision of the aircrew member, during an ejection event the spine of the aircrew member is preferably aligned with a thrust line of the ejection seat.

SUMMARY

According to an embodiment of the present disclosure, an ejection seat for an aircraft includes a seat frame for supporting an aircraft occupant, a backrest pivotally coupled to the seat frame, at least one positioning member coupled to and extending from the backrest, and a release mechanism. The seat frame includes a seat portion and a back portion. The backrest is pivotable between a deployed position and a stored position. The release mechanism is switchable from an engaged position, where the release mechanism engages the positioning member to secure the backrest in the deployed position, and a disengaged position, where the release mechanism is disengaged from the positioning member. The release mechanism switches from the engaged position to the disengaged position in response to an eject signal.

According to another embodiment of the present disclosure, a method of accommodating and ejecting an aircraft occupant includes deploying a retracting backrest to a desired flight position; initiating an ejection event; actuating a release mechanism from an engaged position to a disengaged position in response to an eject signal; retracting both an aircrew member and the backrest to an eject position; and propelling the ejection seat free of the aircraft.

According to yet another embodiment of the present disclosure, a retracting backrest for an ejection seat includes a frame, a support secured to a front of the frame, at least one positioning member extending from the retracting backrest, and a release mechanism engaging the at least one positioning member. The support is capable of supporting an aircrew member during aircraft operation. The release mechanism engaging the at least one positioning member during aircraft operation to maintain the retracting backrest in a deployed position and releasing the at least one positioning member in response to an eject signal.

DETAILED DESCRIPTION

Figure 1A:
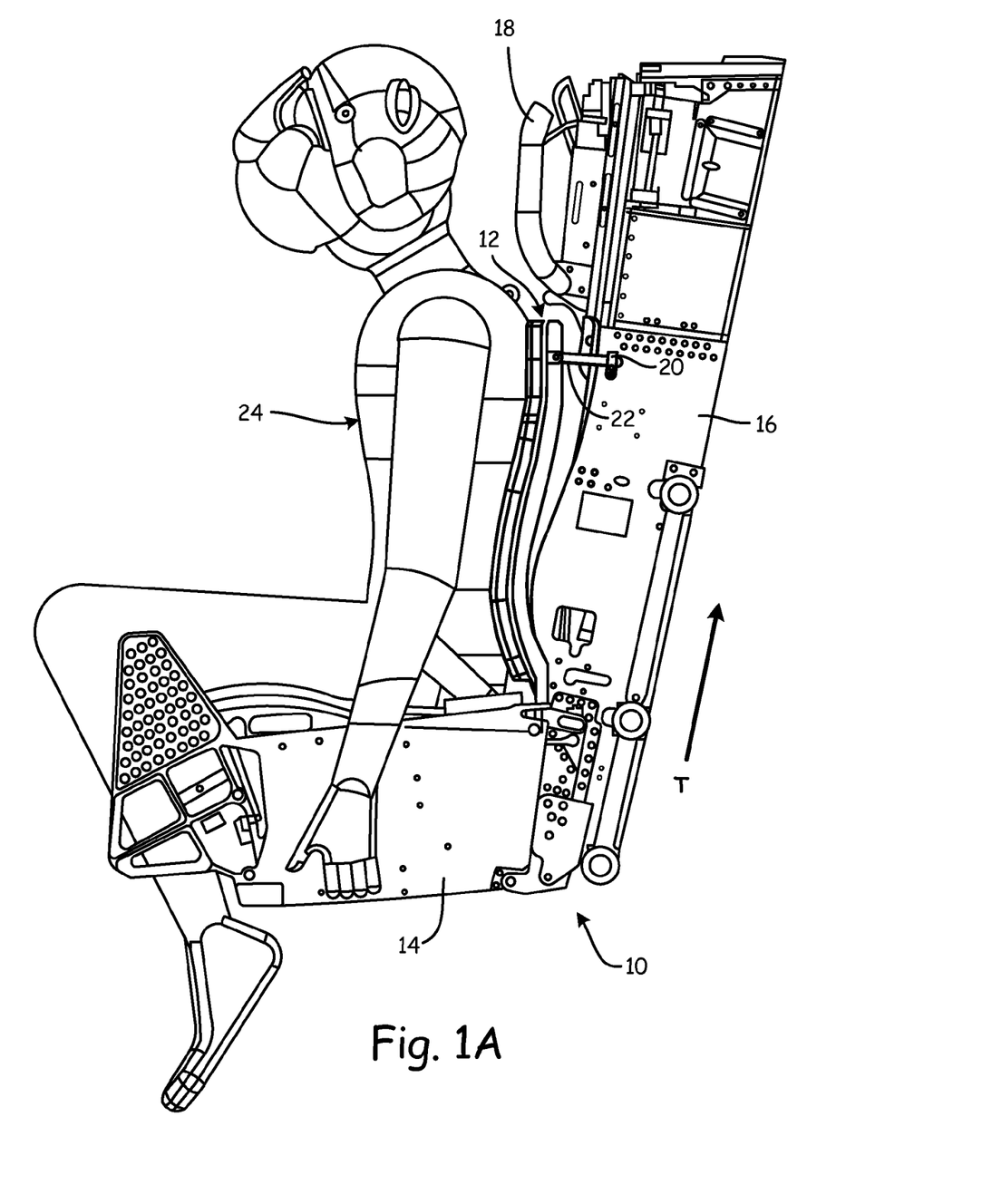
FIG. 1A is a plan view of an ejection seat with a deployed backrest.
Figure 1B:
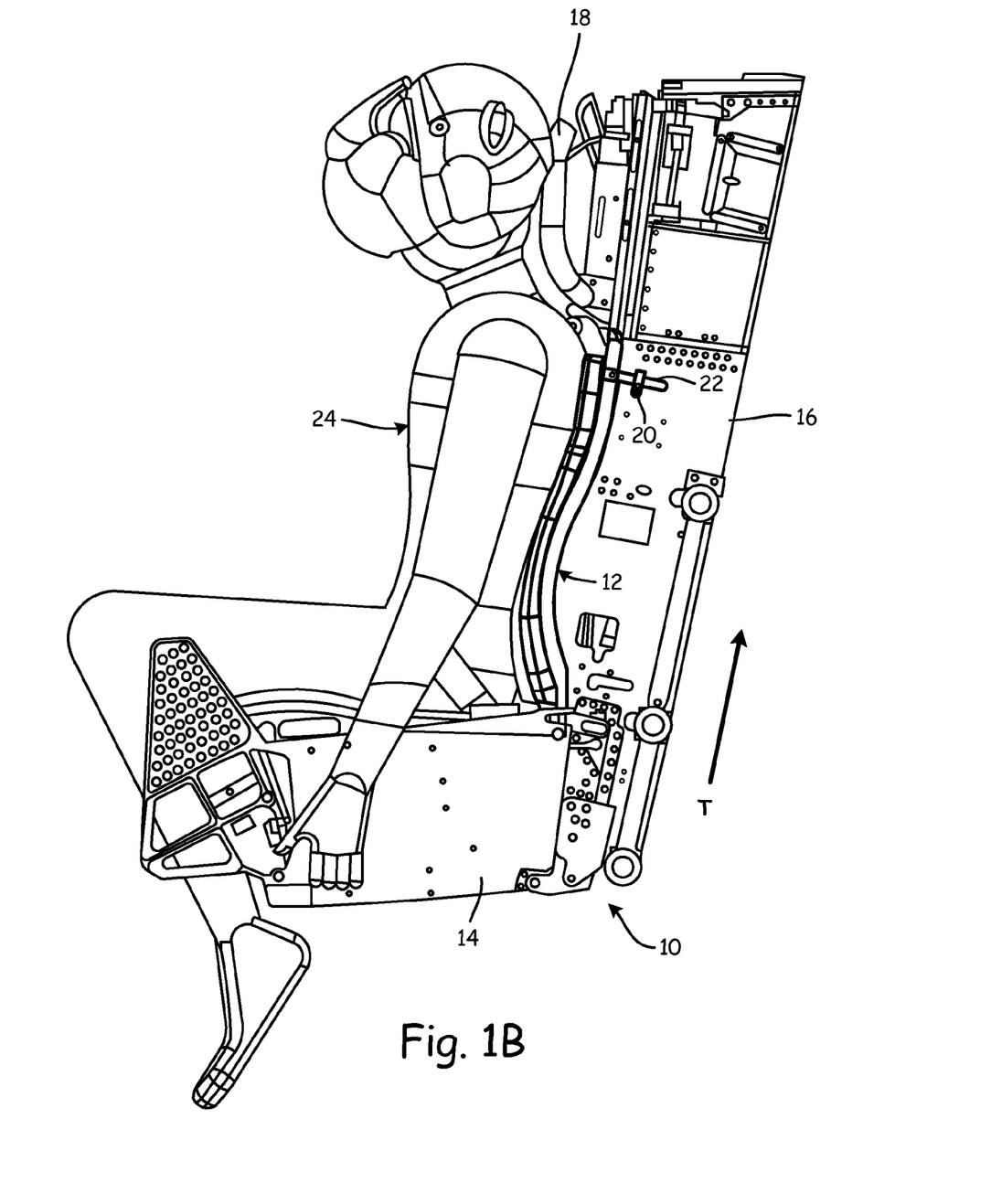
FIG. 1B is a plan view of an ejection seat with a retracted backrest.

FIG. 1A is a plan view of ejection seat 10 and retracting backrest 12, with retracting backrest 12 shown in a deployed position. FIG. 1B is a plan view of ejection seat 10 and retracting backrest 12, with retracting backrest 12 shown in a retracted position. FIGS. 1A and 1B will be discussed together. Ejection seat 10 includes retracting backrest 12, seat portion 14, and back portion 16. Back portion 16 includes headrest 18. Retracting backrest 12 includes release mechanism 20 and positioning members 22. Ejection seat 10 further includes a remote oxygen supply, a propulsion subsystem for propelling ejection seat 10 free of the aircraft in response to an eject signal, and inertia reels for hauling back the crew member prior to ejection, and other features as known in the art.

Seat portion 14 and back portion 16 are joined to form ejection seat 10. Headrest 18 is attached to a top of back portion 16 to support the head of an crew member 24. Retracting backrest 12 is pivotally mounted to back portion 16. Release mechanism 20 is mounted to a side of back portion 16. A first end of positioning member 22 is pivotally secured to a left side of retracting backrest 12, and positioning member 22 is releasably secured by release mechanism 20. A second positioning member (not shown) is secured to a right side of retracting backrest 12 opposite positioning member 22 and the second positioning member releasably engages a second release mechanism (not shown) on the right side of back portion 16.

Before flight operations, retracting backrest 12 can be secured in a deployed position, shown in FIG. 1A. Securing retracting backrest 12 in the deployed position ensures that crew member 24 is properly positioned at the design eye for vision inside and outside of the cockpit and that crew member 24 is able to reach and use all aircraft controls. To position retracting backrest 12, release mechanism 20 is disengaged from positioning member 22, which allows positioning member 22 to freely slide through release mechanism 20. Retracting backrest 12 is leaned forward to the desired position and release mechanism 20 is reengaged with positioning member 22 to secure retracting backrest 12 in the deployed position. Retracting backrest 12 may lean up to about 15 degrees forward relative to back portion 16, and retracting backrest 12 preferably leans up to about 7 degrees forward.

Retracting backrest 12 remains in the deployed position until an eject signal is received. When an eject signal is received, release mechanism 20 is actuated and disengages from positioning member 22. Positioning member 22 is thus free to slide though release mechanism 20, and retracting backrest 12 is no longer secured in the deployed position. During an ejection event, the inertial reels haul back crew member 24 to align the spine of the crew member with a thrust line T of the ejection seat 10, to prevent injury to the crew member 24. With release mechanism 20 disengaged from positioning member 22, the inertial reels haul back both crew member 24 and retracting backrest 12 to a retracted position, as shown in FIG. 1B. In this way, retracting backrest 12 allows crew member 24 to be properly positioned during flight, while also properly aligning crew member 24 during an ejection event. Ejection seat 10 is then accelerated out of the aircraft by the propulsion subsystem.

Figure 2A:
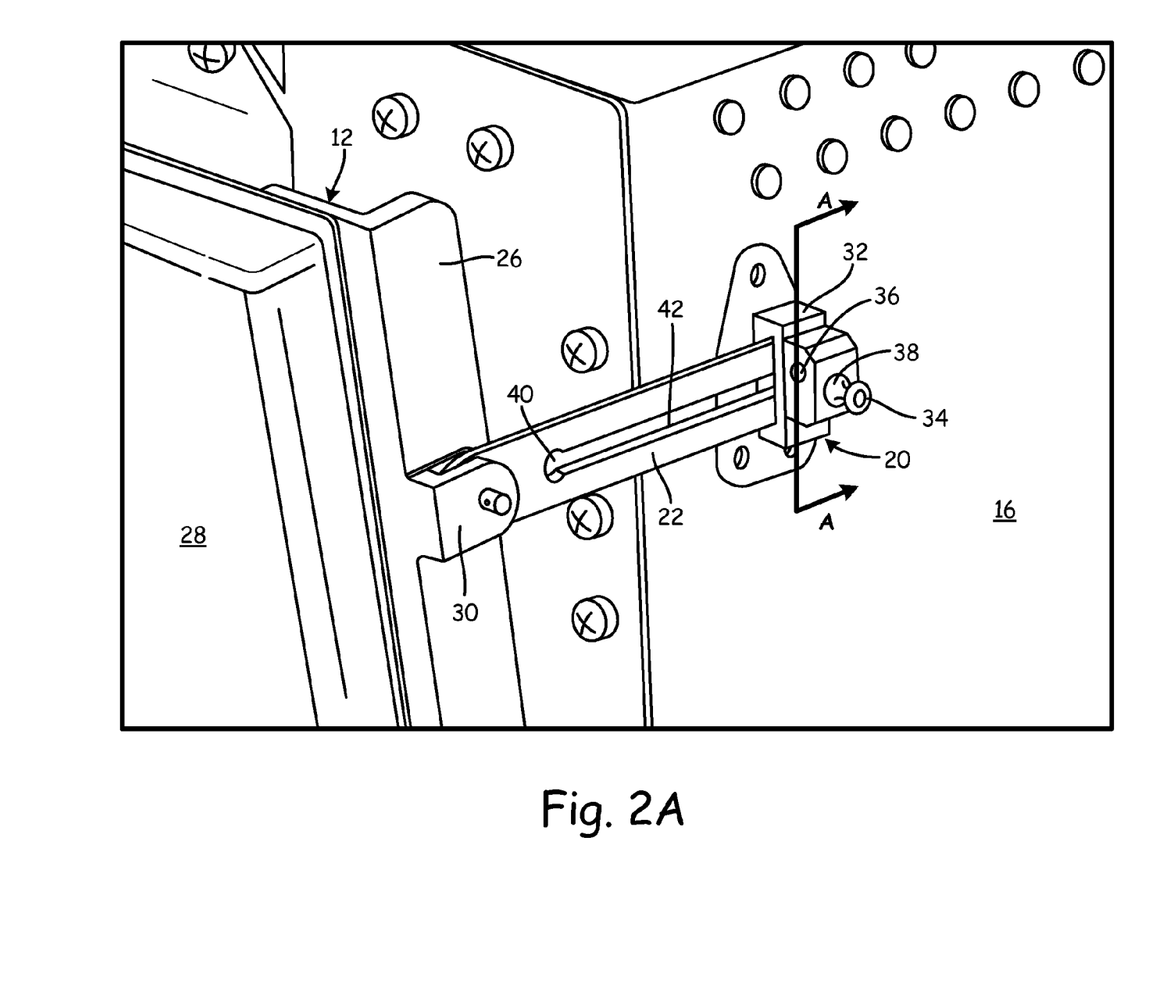
FIG. 2A is a perspective view of a seatback in a deployed position.
Figure 2B:
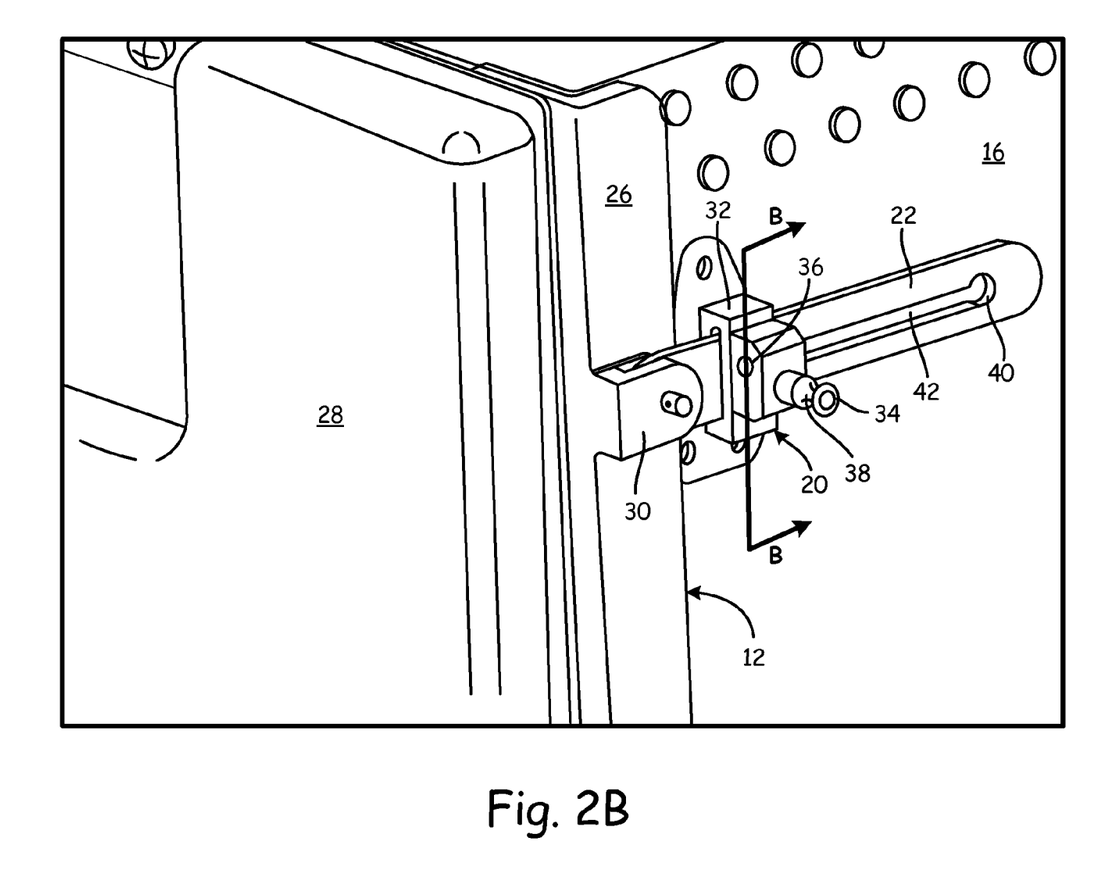
FIG. 2B is a perspective view of a seatback in a retracted position.

FIG. 2A is a perspective view of release mechanism 20 with retracting backrest 12 in a deployed position. FIG. 2B is a perspective view of release mechanism 20 with retracting backrest 12 in a retracted position. FIGS. 2A and 2B will be discussed together. Retracting backrest 12 includes release mechanism 20, positioning member 22, frame 26, support 28, and clevis 30. Release mechanism 20 includes housing 32 and pin 34. Housing 32 includes locking aperture 36, and pin 34 includes grip 38. Positioning member 22 includes positioning apertures 40 and slide opening 42.

Support 28 is attached to a front portion of frame 26 to support crew member 24 (shown in FIG. 1A) during aircraft operation. Clevis 30 extends outward from an edge of frame 26. A first end of positioning member 22 is pivotally secured within clevis 30. Positioning member 22 extends rearward from clevis 30 and into housing 32. Positioning apertures 40 are disposed along a length of positioning member 22. Slide opening 42 extends along a length of positioning member 22 and connects each positioning aperture 40. Pin 34 engages one positioning aperture 40 to secure retracting backrest 12 in the deployed position. In the illustrated embodiment, retracting backrest 12 includes positioning member 22 on a left side of frame 28 and a second positioning member is disposed opposite positioning member 22 on a right side of frame 28. While retracting backrest 12 is described as including two positioning members, retracting backrest 12 may include as many or few positioning members as necessary to secure retracting backrest 12 in the deployed position during flight.

Referring specifically to FIG. 2A, retracting backrest 12 is secured in a deployed position by positioning member 22 and release mechanism 20. Pin 34 engages positioning aperture 40 to secure retracting backrest 12 in a deployed position. To deploy retracting backrest 12, pin 34 is disengaged from positioning member 22 by pulling pin 34 away from housing 32. Grip 38 allows a user to more easily grasp pin 34 to disengaging pin 34 from positioning member 22. To facilitate the deployment of retracting backrest 12, pin 34 can be retained in the disengaged position by inserting a locking pin through locking aperture 36. The locking pin engages pin 34 and thereby prevents pin 34 from shifting back to the engaged position before retracting backrest 12 has been properly positioned. When retracting backrest 12 is deployed, pin 34 is shifted back to an engaged position, whereby pin 34 engages one of positioning apertures 40 to secure retracting backrest 12 in the desired flight position. While positioning member 22 is shown as including two apertures 40, positioning member 22 may include as many or few positioning apertures to meet design criteria. For example, where retracting backrest 12 is deployable to an angle of 15 degrees, positioning member 40 may include one aperture for each full degree of lean, each half degree of lean, or in any other configuration.

In the illustrated embodiment, positioning member 22 is shown as an arm extending from an outer edge of retracting backrest 12 and engaging release mechanism 20. However, positioning member 22 may take any form suitable for retaining retracting backrest 12 in a deployed position, while allowing the inertial reels to quickly haul back retracting backrest 12 and crew member 24 during an ejection event. For example, positioning member 22 may include pneumatic or hydraulic pistons and cylinders, a set of bars pivotally interconnected and extending between back portion 16 and retracting backrest 12, an arced arm, or any other suitable configuration.

Referring specifically to FIG. 2B, release mechanism 20 disengages positioning member 22 in response to an eject signal. Pin 34 is actuated from an engaged position, as shown in FIG. 2A, to a disengaged position, as shown in FIG. 2B. In the disengaged position, pin 34 is disengaged from positioning aperture 40. With pin 34 in the disengaged position, positioning member 22 can freely slide through housing 32. Retracting backrest 12 is no longer secured in the deployed position and can thus be hauled back to the retracted position along with the crew member 24.

Figure 3A:
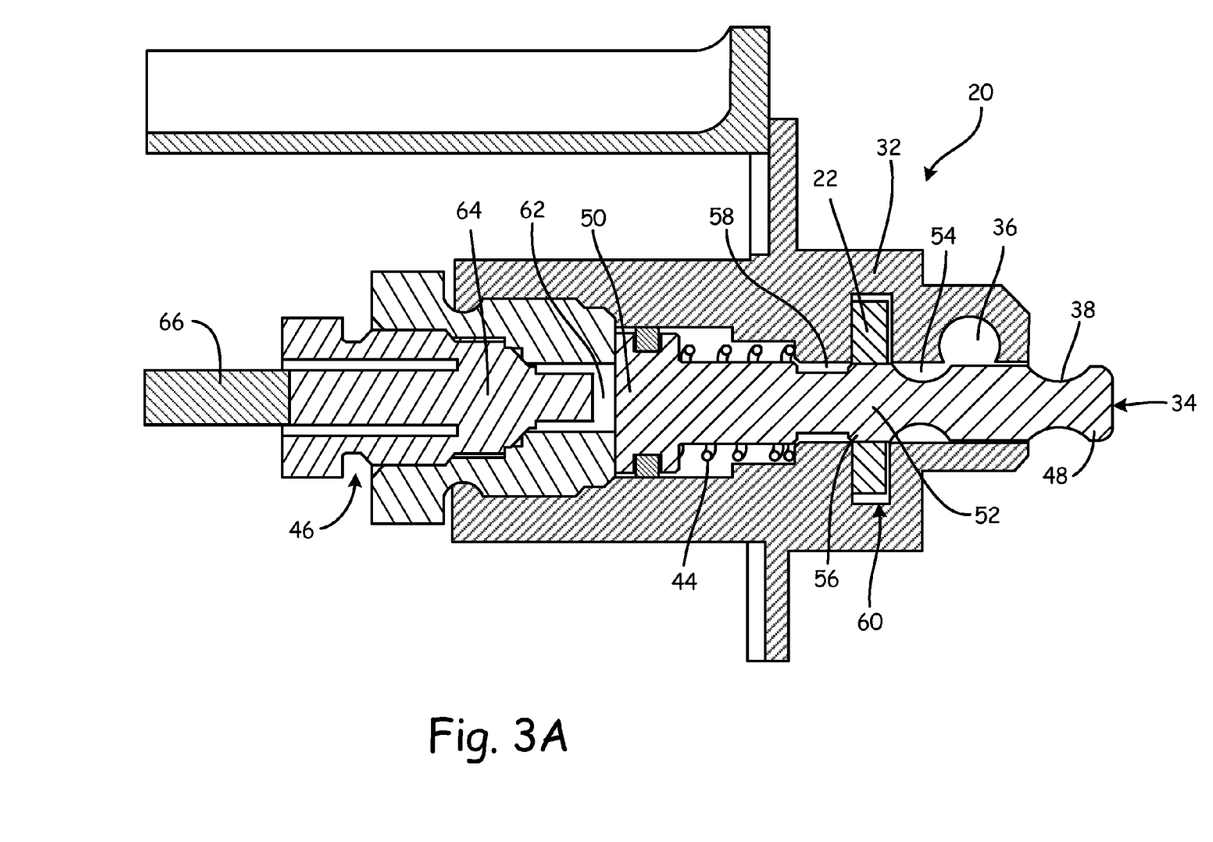
FIG. 3A is a cross-sectional view of a pin puller mechanism in an unfired position taken along line A-A in FIG. 2A.
Figure 3B:
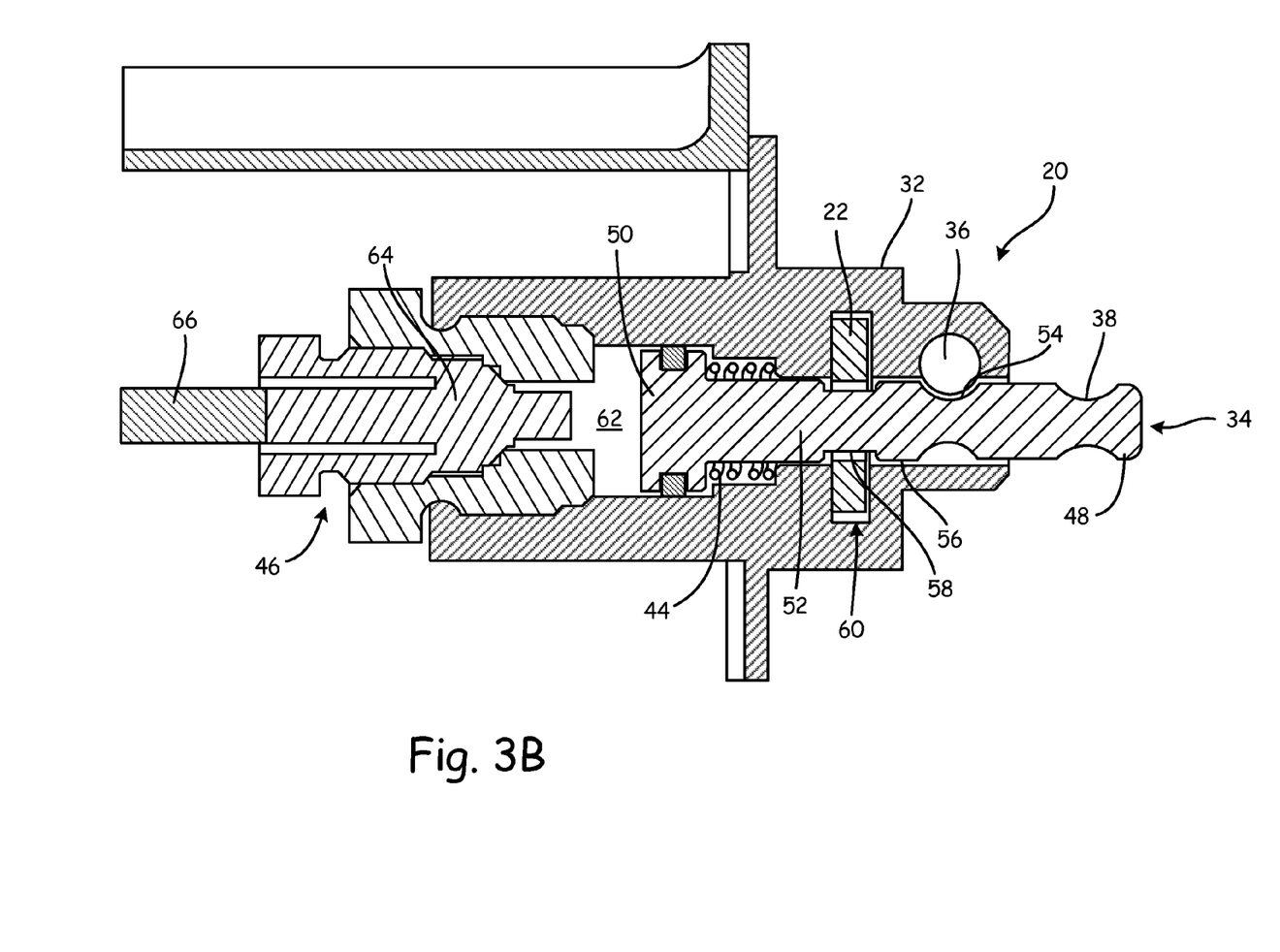
FIG. 3B is a cross-sectional view of a pin puller mechanism in a fired position, taken along line B-B in FIG. 2B

FIG. 3A is a cross-sectional view of release mechanism 20 taken along line A-A of FIG. 2A. FIG. 3B is a cross-sectional view of release mechanism 20 taken along line B-B in FIG. 2B. FIGS. 3A and 3B will be discussed together. Release mechanism 20 includes housing 32, pin 34, spring 44, and actuator 46. As shown, pin 34 includes first end 48, second end 50, and shaft 52. First end 48 includes grip 38. Shaft 52 includes locking groove 54, positioner lock 56, and notch 58. Housing 32 includes locking aperture 36, positioner slot 60, and chamber 62. Actuator 48 includes actuating tip 64 and actuation line 66.

Housing 32 is mounted to a side of back portion 16 (best seen in FIG. 1A). Pin 34 is slidably retained within housing 32. First end 48 extends out of housing 32, with grip 38 exposed such that pin 34 can be manually shifted. Shaft 52 extends between and connects first end 48 and second end 50. Second end 50 is retained within chamber 62, and chamber 62 is defined by housing 32. Second end 50 abuts actuator 48 when pin 34 is in an engaged position. Spring 44 is disposed within chamber 62 and surrounds shaft 52. Spring 44 abuts housing 32 and second end 50. Actuator 48 is attached to housing 34. Actuation line 66 passes through back portion 16 and is connected to actuating tip 64. Actuating tip 64 is positioned to discharge a gas into chamber 62. The gas pressurizes chamber 62 to actuate pin 34 from the engaged position, shown in FIG. 3A, to the disengaged position, shown in FIG. 3B.

In the illustrated embodiment, first end 48 of pin 34 protrudes outside of housing 32 such that grip 38 is exposed. A user can grasp grip 38 to manually disengage pin 34 from positioning member 22. As shown in FIG. 3B, when pin 34 is disengaged from positioning member 22, locking groove 54 is aligned with locking aperture 36. Aligning locking groove 50 with locking aperture 36 provides a pathway through which a locking pin can be inserted to secure pin 34. The locking pin engages locking groove 54 to retain pin 34 in the disengaged position. With pin 34 in the disengaged position, adjustment notch 58 is aligned with slide opening 42 of positioning member 22, thereby allowing positioning member 22 to freely slide between any one of the deployed positions and the retracted position, thereby allowing the user to properly position retracting backrest 12. After deploying retracting backrest 12, the locking pin can be removed and pin 34 is returned to an engaged position by spring 44.

Referring specifically to FIG. 3A, pin 34 engages positioning member 22 to retain retracting backrest 12 in the deployed position. In the engaged position, positioner lock 56 engages an aperture 40 of positioning member 22 (best seen in FIG. 2B) to retain positioning member 22 in a desired position. Spring 44 biases second end 50 towards actuator 46 to retain pin 34 in the engaged position. Pin 34 remains in the engaged position to properly align a crew member until an eject signal is received.

Upon initiation of an ejection event, an eject signal is generated. Actuator 46 fires and causes pin 34 to shift from the engaged position, shown in FIG. 3A, to the disengaged position, shown in FIG. 3B, in response to an eject signal. Actuation line 66 fires and triggers actuating tip 64. Actuation line 66 is preferably a pyrotechnic line, such as a thin layer explosive (TLX) line, but actuation line 66 may be any suitable line to quickly provide a signal to actuate release mechanism 20. Actuating tip 64 is preferably a gas generating tip, such that actuating tip 64 generates a pressurized gas, which fills chamber 62 and overcomes the force of spring 44 to force pin 34 from the engaged position to the disengaged position. While actuator 46 has been described as a pyrotechnic actuator, actuator 46 may actuate pin 34 in any suitable manner that quickly disengages pin 34 from positioning member 22, such that the inertial reels can haul back both the crew member and retracting backrest 12, such as electrically or mechanically.

Actuator 46 shifts pin 34 from the engaged position to the disengaged position. With pin 34 in the disengaged position, adjustment notch 58 is aligned with slide opening 42 of positioning member 22. Aligning adjustment notch 58 and slide opening 42 allows positioning member 22 to freely slide through positioner slot 60 of housing 32. The inertial reels can thus haul back both the aircrew member and retracting backrest 12 to a desired ejection position.

Figure 4:
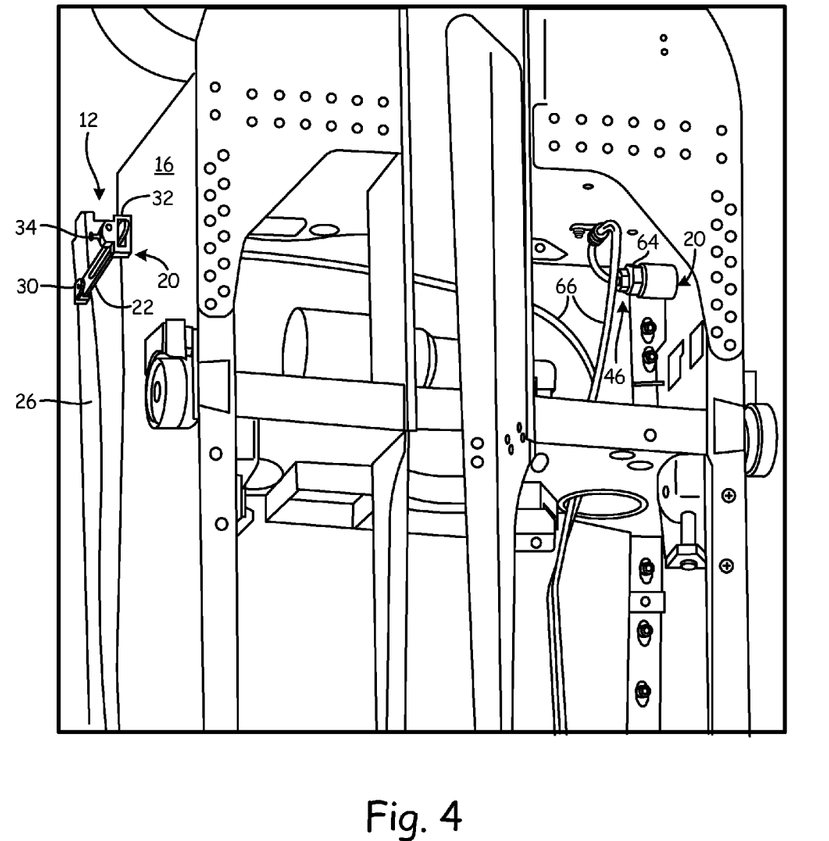
FIG. 4 is a rear perspective view of an ejection seat.

FIG. 4 is a rear perspective view of ejector seat 10 with retracting backrest 12 in the deployed position. Back portion 16 of ejection seat 10 is shown. Retracting backrest 12 includes release mechanisms 20, positioning members 22 (only one of which is shown), frame 26, and clevis 30. Housing 32, pin 34, and actuator 46 of release mechanism 20 are shown. Actuator 46 includes actuating tip 64 and actuation line 66.

Housing 32 is mounted to back portion 16, and housing 32 extends from an interior to an exterior of back portion 16. Clevis 30 is mounted to an edge of frame 28. Positioning member 22 is pivotally mounted within clevis 30 and extends though housing 32. Positioning member 22 is engaged by pin 34 to retain positioning member 22 in a deployed position, thereby securing retracting backrest 12 in the deployed position. Actuator 46 is engaged with housing 32, with actuating tip 64 extending into housing 32. Actuation lines 66 extend between an initiator, which triggers actuator 46 in response to an eject signal, and actuating tip 64.

As previously discussed, retracting backrest 12 remains in a deployed position until an ejection event is triggered. Triggering the ejection event generates an eject signal and the initiator fires the actuation lines 66 in response to the eject signal. In turn, actuation lines 66 fire actuating tips 60 which pressurize housing 34 to actuate pin 34 from the engaged position to the disengaged position. With pin 34 disengaged from positioning member 22, positioning member 22 is free to slide through housing 32. The eject signal also triggers the inertial reels, which haul back the crew member. With pin 34 disengaged from positioning member 22, the inertial reels also haul back retracting backrest 12 to the retracted position. Hauling back retracting backrest 12 allows the crew member to be properly aligned with the thrust line of ejection seat 10, which reduces the risk of injury to the crew member.

Deploying retracting backrest 12 allows the crew member to have a desired line of sight inside and outside of the cockpit and to reach all the controls within the cockpit. However, in response to an eject signal, retracting backrest 12 can be unsecured from the deployed position, which allows both retracting backrest 12 and the crew member to be hauled back to properly align the crew member during the ejection event.

Figure 5A:
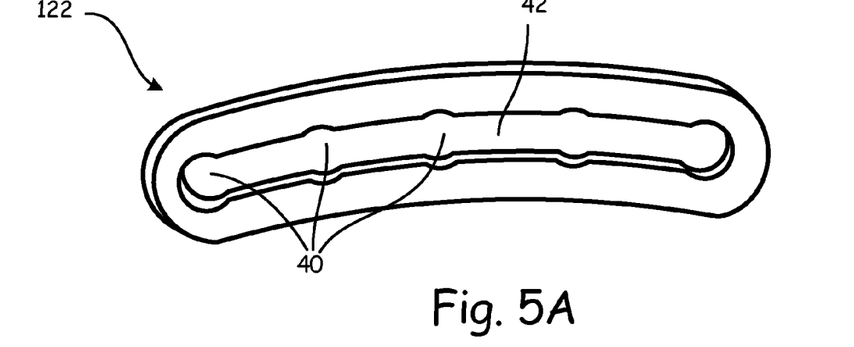
FIG. 5A is a perspective view of a positioning member.

FIG. 5A is a perspective view of positioning member 122. Positioning member 122 includes positioning apertures 40 and slide opening 42. Positioning member 122 is an arced positioning member. Positioning apertures 40 extend through positioning member 122. Slide opening 42 extends along a length of positioning member 122 and connects each positioning aperture 40 with the other positioning apertures 40. As previously discussed, positioning apertures 40 are configured to be engaged by a release mechanism, such as release mechanism 20 (shown in FIG. 2A), to secure retracting backrest 12 (shown in FIG. 2A) in a deployed position. Slide opening 42 is configured to allow positioning member 122 to slide over a securing member, such as pin 34 (shown in FIG. 2A), when positioning member 122 is not engaged by the release mechanism.

Figure 5B:
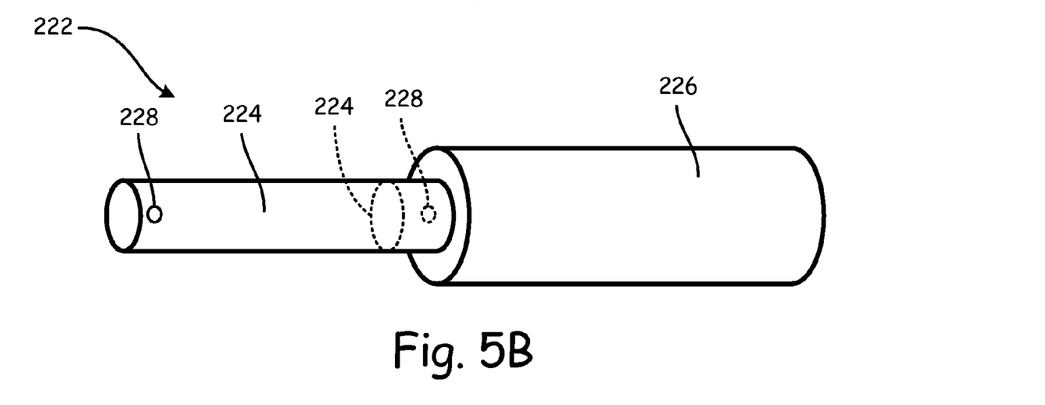
FIG. 5B is a perspective view of a positioning member.

FIG. 5B is a perspective view of positioning member 222. Positioning member 222 includes piston 224 and cylinder 226. Piston 224 includes aperture 228. Positioning member 222 is secured between back portion 16 (shown in FIG. 2A) and retracting backrest 12 (shown in FIG. 2A). Aperture 228 is capable of receiving a fastener to secure piston 224 to retracting backrest. Piston 224 may be secured at any suitable position on retracting backrest 12, such as within clevis 30 (best seen in FIG. 2A). Positioning member 222 is preferably pneumatically or hydraulically actuated. Piston 224 is pneumatically or hydraulically secured in an extended position to secure retracting backrest 12 in a deployed position. In response to an eject signal, piston 224 is released from the secured position. Piston 224 can then be actuated from the extended position to a retracted position, shown in dashed lines, as retracting backrest 12 to is hauled back to a stowed position.

Figure 5C:
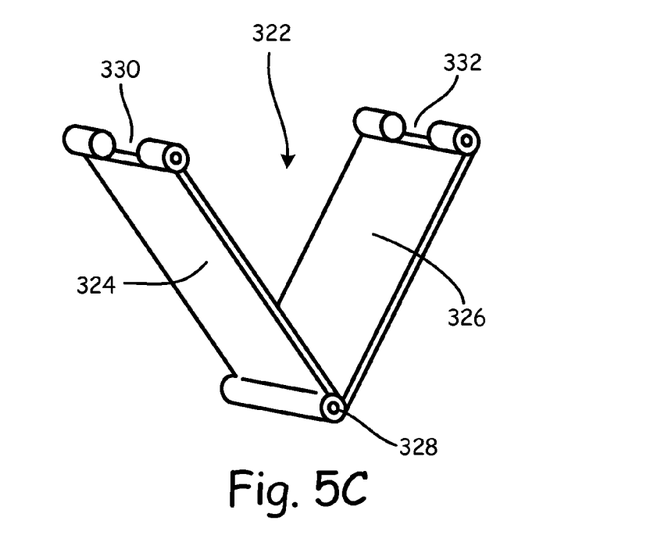
FIG. 5C is a perspective view of a positioning member.

FIG. 5C is a perspective view of positioning member 322. Positioning member 322 includes first bar 324, second bar 326, and hinge 328. First bar 324 includes first clevis 330. Second bar 326 includes second clevis 332. First bar 324 is pivotally secured to second bar 326 by hinge 328. First bar 324 is capable of being pivotally secured to retracting backrest 12 (best seen in FIG. 1A) by securing a first projection extending from retracting backrest 12 within first clevis 330. Similarly, second bar 326 is capable of being secured to back portion 16 (best seen in FIG. 1A) by inserting and securing a second projection extending from back portion 16 within second clevis 332. Hinge 328 is capable of being locked, such that hinge 328 secures retracting backrest 12 in the deployed position. In response to an eject signal, hinge 328 is released from the locked position, thereby allowing retracting backrest 12 to be hauled back to the stowed position.

Discussion of Possible Embodiments

The following are non-exclusive descriptions of possible embodiments of the present invention.

An ejection seat for an aircraft includes a seat frame including a seat portion and a back portion; a backrest pivotally coupled to the seat frame, the backrest pivotable between a deployed position and a stored position, at least one positioning member coupled to and extending from the backrest; and a release mechanism coupled to the back portion, the release mechanism switchable from an engaged position, where the release mechanism engages the positioning member to secure the backrest in the deployed position, and a disengaged position.

The ejection seat of the preceding paragraph can optionally include, additionally and/or alternatively, any one or more of the following features, configurations and/or additional components:

An actuator extending between an initiator and the release mechanism, the initiator triggering the actuator in response to an eject signal, and the actuator switching the release mechanism from the engaged position to the disengaged position.

A actuating tip coupled to the release mechanism, and an actuation line extending between the initiator and the actuating tip.

A pyrotechnic line.

A thin layer explosive (TLX) line.

An arm pivotally attached to the backrest and at least one positioning aperture extending through the arm.

A housing mounted to the back portion, the housing having a slot extending therethrough, wherein the positioning member is slidably disposed in the slot, and a pin extending through the housing, the pin engaging the at least one positioning aperture when the release mechanism is in an engaged position and switching to the disengaged position in response to an eject signal.

A locking aperture extending therethrough, the locking aperture capable of receiving a locking pin, and the locking pin capable of engaging the pin to maintain the pin in a disengaged position.

A piston and cylinder.

A plurality of bars pivotally interconnected, a first one of the plurality of bars pivotally connected to the back portion, and a second one of the plurality of bars pivotally connected to backrest.

The backrest has a degree of lean up to about 15 degrees in the deployed position.

A method of accommodating and ejecting an aircraft occupant includes deploying a retracting backrest to a deployed position; initiating an ejection event; actuating a release mechanism from an engaged position to a disengaged position in response to an eject signal; retracting the backrest to an eject position; and propelling the ejection seat free of the aircraft.

The method of the preceding paragraph can optionally include, additionally and/or alternatively, any one or more of the following features, configurations and/or additional components:

Firing a TLX line in response to the eject signal, the TLX line generating a gas and pressurizing a housing chamber of the release mechanism with the gas, the pressure shifting a pin of the release mechanism from an engaged position to a disengaged position.

Disengaging the release mechanism from the positioning member; shifting the retracting backrest to the flight position; and reengaging a positioning member with the release mechanism to secure the backrest in the flight position.

Shifting a pin from a first position, where the pin is engaged with a positioning aperture disposed through the positioning member, to a second position, where the pin is disengaged from the positioning aperture.

A retracting backrest for an ejection seat includes a frame; a support secured to a front of the frame, the support capable of supporting an aircrew member during aircraft operation; at least one positioning member extending from the retracting backrest; and a release mechanism engaging the at least one positioning member during aircraft operation to maintain the retracting backrest in a deployed position and releasing the at least one positioning member in response to an eject signal.

The retracting backrest of the preceding paragraph can optionally include, additionally and/or alternatively, any one or more of the following features, configurations and/or additional components:

A clevis extending from an outer edge of the frame, wherein the at least one positioning member is pivotally secured within the clevis.

An arm pivotally attached to the frame and at least one positioning aperture extending through the arm.

A piston and cylinder.

A plurality of bars pivotally interconnected; a first one of the plurality of bars pivotally connected to a rear of the frame; and a second one of the plurality of bars connected to the release mechanism.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An ejection seat for an aircraft comprising:
    a seat frame including a seat portion and a back portion;
    a backrest pivotally coupled to the seat frame such that the backrest is movable relative to the seat portion and the back portion, the backrest pivotable between a deployed position and a stowed position;
    at least one positioning member coupled to and extending from the backrest; and
    a release mechanism coupled to the back portion, the release mechanism switchable from an engaged position, where the release mechanism engages the positioning member to secure the backrest in the deployed position, and a disengaged position, where the release mechanism is disengaged from the positioning member.

2. The ejection seat of claim 1, and further comprising:
    an actuator extending between an initiator and the release mechanism, the initiator triggering the actuator in response to an eject signal, and the actuator switching the release mechanism from the engaged position to the disengaged position.

3. The ejection seat of claim 2, wherein the actuator further comprises:
    an actuating tip coupled to the release mechanism; and
    an actuation line extending between the initiator and the actuating tip.

4. The ejection seat of claim 3, wherein the actuation line comprise:
    a pyrotechnic line.

5. The ejection seat of claim 4, wherein the pyrotechnic line comprises:
    a thin layer explosive (TLX) line.

6. The ejection seat of claim 1, wherein the at least one positioning member comprises:
    an arm pivotally attached to the backrest; and at least one positioning aperture extending through the arm.

7. The ejection seat of claim 6, wherein the release mechanism comprises:
   a housing mounted to the back portion, the housing having a slot extending therethrough, wherein the positioning member is slidably disposed in the slot; and
   a pin extending through the housing, the pin engaging the at least one positioning aperture when the release mechanism is in an engaged position and switching to the disengaged position in response to an eject signal.

8. The ejection seat of claim 7, wherein the housing further comprises:
   a locking aperture extending therethrough, the locking aperture capable of receiving a locking pin, and the locking pin capable of engaging the pin to maintain the pin in a disengaged position.

9. The ejection seat of claim 1, wherein the at least one positioning member comprises:
   a piston and cylinder.

10. The ejection seat of claim 1, wherein the at least one positioning member comprises:
    a plurality of bars pivotally interconnected;
    a first one of the plurality of bars pivotally connected to the back portion; and
    a second one of the plurality of bars connected to the backrest.

11. The ejection seat of claim 1, wherein the backrest has a degree of lean up to about 15 degrees in the deployed position.

12. A method of accommodating and ejecting an aircraft occupant comprising:
    deploying a retracting backrest of an ejection seat to a deployed position, the backrest pivotable relative to a seat portion and a back portion of the ejection seat;
    initiating an ejection event;
    actuating a release mechanism from an engaged position to a disengaged position in response to an eject signal;
    retracting the backrest to an eject position; and
    propelling the ejection seat free of the aircraft.

13. The method of claim 12, wherein actuating the release mechanism from an engaged to a disengaged position comprises:
    firing a TLX line in response to the eject signal, the TLX line generating a gas; and
    pressurizing a housing chamber of the release mechanism with the gas, the pressure shifting a pin of the release mechanism from an engaged position to a disengaged position.

14. The method of claim 12, wherein deploying a retracting backrest to a deployed position further comprises:
    disengaging the release mechanism from the positioning member;
    shifting the retracting backrest to the flight position; and
    reengaging a positioning member with the release mechanism to secure the backrest in the flight position.

15. The method of claim 12, wherein disengaging the release mechanism from the positioning member further comprises:
    shifting a pin from a first position, where the pin is engaged with a positioning aperture disposed through the positioning member, to a second position, where the pin is disengaged from the positioning aperture.

16. A retracting backrest for an ejection seat, the retracting backrest comprising:
    a frame configured to connect to and to be movable relative to a seat portion and a back portion of a seat frame, the frame configured to pivot between a deployed position and a stowed position;
    a support secured to a front of the frame, the support capable of supporting an aircrew member during aircraft operation;
    at least one positioning member extending from the frame; and
    a release mechanism switchable between an engaged position, where the release mechanism engages the at least one positioning member during aircraft operation to maintain the frame in the deployed position, and a disengaged position, where the release mechanism is disengaged from the at least one positioning member in response to an eject signal.

17. The retracting backrest of claim 16, wherein the frame further comprises:
    a clevis extending from an outer edge of the frame, wherein the at least one positioning member is pivotally secured within the clevis.

18. The retracting backrest of claim 16, wherein the at least one positioning member comprises:
    an arm pivotally attached to the frame; and
    at least one positioning aperture extending through the arm.

19. The retracting backrest of claim 16, wherein the at least one positioning member comprises:
    a piston and cylinder.

20. The retracting backrest of claim 16, wherein the at least one positioning member comprises:
    a plurality of bars pivotally interconnected;
    a first one of the plurality of bars pivotally connected to a rear of the frame; and
    a second one of the plurality of bars connected to the release mechanism.

* * * * *